(12) United States Patent
Uno et al.

(10) Patent No.: US 10,771,165 B2
(45) Date of Patent: Sep. 8, 2020

(54) INFORMATION PROCESSING APPARATUS, ELECTRONIC DEVICE, AND INFORMATION PROCESSING SYSTEM

(71) Applicants: Sony Corporation, Tokyo (JP); Sony Mobile Communications Inc., Tokyo (JP)

(72) Inventors: Masahiro Uno, Tokyo (JP); Takaaki Hashiguchi, Tokyo (JP); Hideaki Shoji, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 16/301,979

(22) PCT Filed: Apr. 10, 2017

(86) PCT No.: PCT/JP2017/014659
§ 371 (c)(1),
(2) Date: Nov. 15, 2018

(87) PCT Pub. No.: WO2017/212769
PCT Pub. Date: Dec. 14, 2017

(65) Prior Publication Data
US 2019/0165870 A1 May 30, 2019

(30) Foreign Application Priority Data
Jun. 7, 2016 (JP) .................................. 2016-113406

(51) Int. Cl.
*H04B 13/00* (2006.01)
*H04B 5/02* (2006.01)
(Continued)

(52) U.S. Cl.
CPC ............. *H04B 13/005* (2013.01); *H01Q 1/24* (2013.01); *H01Q 1/243* (2013.01); *H01Q 1/245* (2013.01);
(Continued)

(58) Field of Classification Search
CPC ........... H04B 13/005; H04B 5/02; H01Q 1/24
(Continued)

(56) References Cited

U.S. PATENT DOCUMENTS

2007/0278898 A1* 12/2007 Miura .................. H03H 9/0222
310/313 R
2009/0088114 A1 4/2009 Yoshita et al.
(Continued)

FOREIGN PATENT DOCUMENTS

| CN | 101399570 A | 4/2009 |
|---|---|---|
| JP | 2009-081771 A | 4/2009 |

(Continued)

OTHER PUBLICATIONS

International Search Report for application No. PCT/JP2017/014659 dated Jun. 26, 2017.

*Primary Examiner* — Eugene Yun
(74) *Attorney, Agent, or Firm* — Michael Best & Friedrich LLP

(57) ABSTRACT

An information processing apparatus according to an embodiment of the present technology is capable of executing electric field communication and includes an antenna, a medium side electrode, and a communication unit. The antenna is used for other communication different from the electric field communication. The communication unit is electrically connected to each of the antenna and the medium side electrode and executes the electric field communication by using the antenna and the medium side electrode.

20 Claims, 11 Drawing Sheets

(51) Int. Cl.
*H01Q 9/30* (2006.01)
*H01Q 1/24* (2006.01)
*H01Q 21/28* (2006.01)

(52) U.S. Cl.
CPC ............... *H01Q 9/30* (2013.01); *H01Q 21/28* (2013.01); *H04B 5/02* (2013.01); *H04B 13/00* (2013.01)

(58) Field of Classification Search
USPC ........................................................ 455/41.1
See application file for complete search history.

(56) References Cited

U.S. PATENT DOCUMENTS

| | | | | |
|---|---|---|---|---|
| 2015/0145350 A1* | 5/2015 | Hajimiri | ............... | H02M 7/217 |
| | | | | 307/149 |
| 2015/0179007 A1* | 6/2015 | Todaka | ............... | G07C 9/00111 |
| | | | | 340/5.6 |
| 2019/0188424 A1* | 6/2019 | Washiro | ................... | H04B 5/02 |

FOREIGN PATENT DOCUMENTS

| | | | |
|---|---|---|---|
| JP | 2011-244082 A | 12/2011 | |
| JP | 5349612 B2 | 11/2013 | |

* cited by examiner

INFORMATION PROCESSING APPARATUS, ELECTRONIC DEVICE, AND INFORMATION PROCESSING SYSTEM

TECHNICAL FIELD

The present technology relates to an information processing apparatus capable of executing electric field communication, an electronic device, and an information processing system.

BACKGROUND ART

In the related art, electric field communication using fluctuation of an electric field is known. For example, Patent Literature 1 describes a communication apparatus that performs the electric field communication via a human body. The communication apparatus can perform both of wireless communication via an antenna and the electric field communication via the human body. As shown in FIG. 1 of Patent Literature 1, a conductor plate as an electrode at a human body side for the electric field communication is arranged near the antenna of the wireless communication. In addition, a sum of a line length of a signal wire from a terminal on a substrate to the conductor plate and half a circumferential length of the conductor plate is equal to integral times of half the wavelength of a resonance frequency of the antenna. In this manner, deterioration of performance of the antenna is avoided (paragraphs [0012], [0028], or the like of specification of Patent Literature 1).

CITATION LIST

Patent Literature

Patent Literature 1: Japanese Patent No. 5349612

DISCLOSURE OF INVENTION

Technical Problem

It is conceivable that the electric field communication continues to be popular. It is desirable to provide a technology that avoids an increase in size of an apparatus and is capable of executing high communication performance.

The present technology is made in view of the above-mentioned circumstances, and it is an object of the present technology to provide an information processing apparatus that avoids an increase in size of an apparatus and is capable of improving communication performance of electric field communication, an electronic device, and an information processing system.

Solution to Problem

In order to achieve the above-described object, an information processing apparatus according to an embodiment of the present technology is capable of executing electric field communication and includes an antenna, a medium side electrode, and a communication unit.

The antenna is used for other communication different from the electric field communication.

The communication unit is electrically connected to each of the antenna and the medium side electrode and executes the electric field communication by using the antenna and the medium side electrode.

In this information processing apparatus, the electric field communication is executed by using the antenna that is used for other communication different from the electric field communication. As a result, it will be possible to decrease the number of parts needed for the electric field communication and to avoid an increase in size of an apparatus. Also, it will be possible to exhibit high communication performance.

The other communication may be cellular communication.

By using the antenna for the cellular communication, it will be possible to avoid an increase in size of an apparatus and to improve communication performance of the electric field communication.

The information processing apparatus may further include other communication unit that has an impedance matching circuit electrically connected to the antenna and executes the other communication. In this case, the communication unit may be connected to the antenna via a connection point between the antenna and the matching circuit.

Thus, it will be possible to set the impedance of the communication unit to be high seen from the other communication unit. As a result, the communication performance of the electric field communication can be improved.

The antenna may have impedance to a signal of the electric field communication higher than impedance to a signal of the other communication.

This allows high communication performance to be exhibited.

The communication unit may have impedance to the signal of the other communication higher than that of the other communication unit.

This will allow high communication performance to be exhibited.

The other communication unit may have a blocking circuit that inhibits a current generated by the human body communication from flowing into the other communication unit.

This will allow high communication performance to be exhibited.

The communication unit may have a blocking circuit that inhibits a signal of the other communication from flowing into the communication unit.

This will allow high communication performance to be exhibited.

The medium side electrode may be a conductive member, the conductive member being used for other application different from the human body communication.

This will allow to avoid an increase in size of an apparatus.

The information processing apparatus may further includes a case. In this case, the medium side electrode may be a part of the case.

As a result, it will be possible to decrease the number of parts needed for the electric field communication and to avoid an increase in size of an apparatus.

The medium side electrode may be a ground plane or a power plane.

As a result, it will be possible to decrease the number of parts needed for the electric field communication and to avoid an increase in size of an apparatus.

The information processing apparatus may further include a selection unit that selects one medium side electrode from a plurality of medium side electrodes and causes the one medium side electrode to electrically connect to the communication unit.

In the information processing apparatus, a plurality of medium side electrodes are arranged and the medium side electrode used for the electric field communication is selected as appropriate. This will allow high communication performance to be exhibited.

The selection unit may include a sensor unit that detects a status of the information processing apparatus and selects the medium side electrode on the basis of a detection result of the sensor unit.

Since the medium side electrode can be selected depending on the status of the information processing apparatus, this will allow high communication performance to be exhibited.

The selection unit may select the medium side electrode on the basis of a posture of the information processing apparatus detected by the sensor unit.

This will allow high communication performance to be exhibited.

An electronic device according to an embodiment of the present technology is capable of executing the electric field communication and includes the antenna, the medium side electrode, and the communication unit.

An information processing system according to an embodiment of the present technology includes a plurality of information processing apparatuses being capable of executing the electric field communication. Among them, at least one information processing apparatus includes the antenna, the medium side electrode, and the communication unit.

Advantageous Effects of Invention

As described above, according to the present technology, it will be possible to avoid an increase in size of an apparatus and to improve communication performance of the electric field communication. It should be noted that the effects described here are not necessarily limitative and may be any of effects described in the present disclosure.

MODE(S) FOR CARRYING OUT THE INVENTION

Hereinafter, embodiments of the present disclosure will be described with reference to the drawings.

First Embodiment

[Basic Principle of Electric Field Communication]

Figure 1:
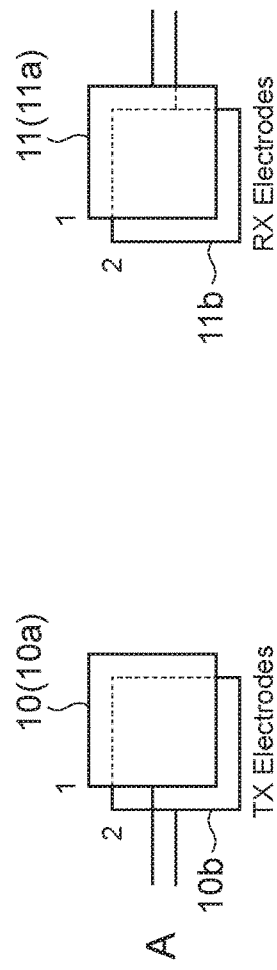
FIG. 1 is a schematic view for describing a basic principle of electric field communication and inventor's studies.
Figure 1:
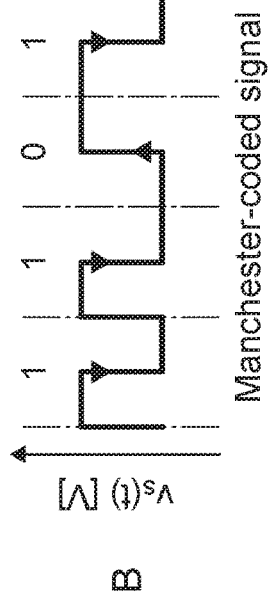
Figure 1:
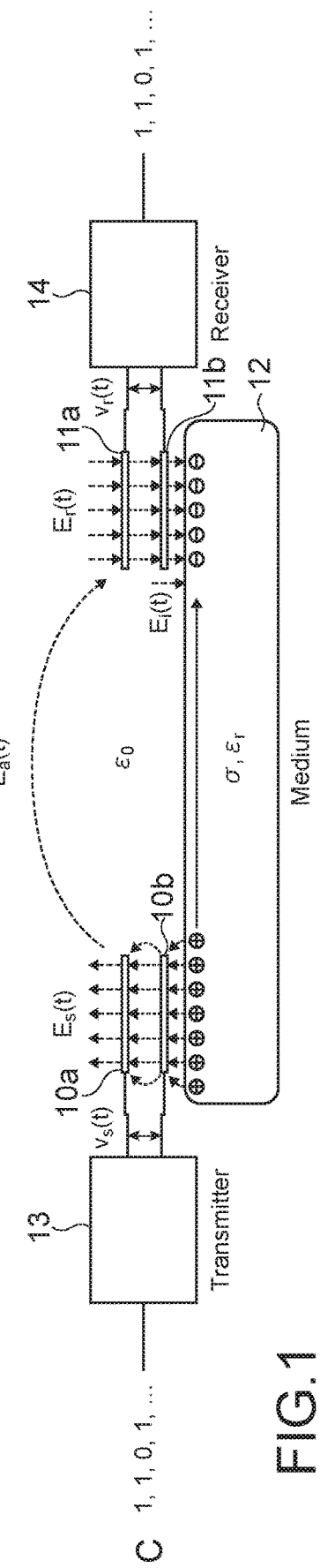
Figure 2:
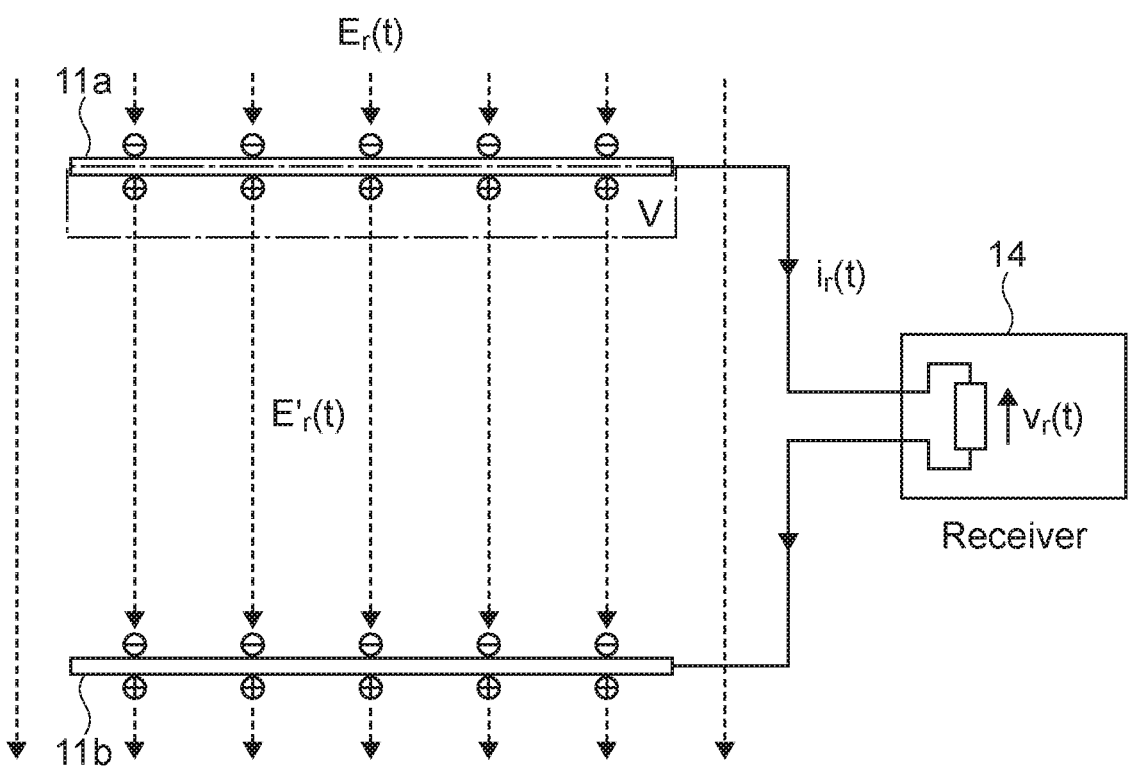
FIG. 2 is a view for describing an operating principle of a reception side of the electric field communication.
Figure 3:
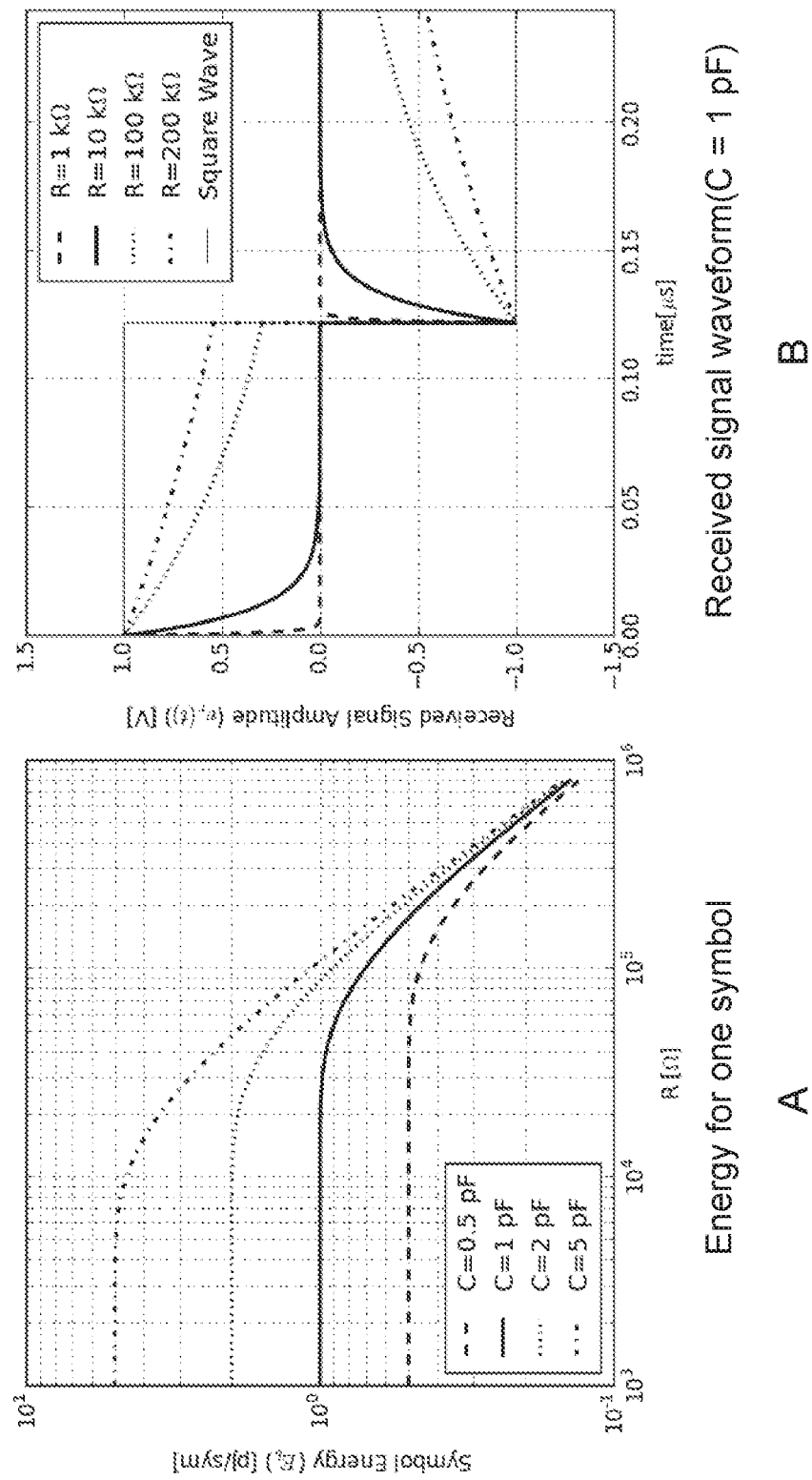
FIG. 3 are graphs showing received signal energy Eb and potential difference vr(t), respectively.

FIG. 1 to FIG. 3 are schematic views for describing a basic principle of electric field communication and inventor's studies.

The electric field communication is a communication method that uses fluctuation of an electric field (electrical field) and is also called as quasi-electrostatic field communication. As shown in FIG. 1A, two transmission electrodes 10 and two reception electrodes 11 are used. If a voltage corresponding to data is applied to the transmission electrodes 10a and 10b, a fluctuating electric field is generated around the transmission electrodes 10a and 10b. The reception electrodes 11a and 11b are arranged in the fluctuating electric field and a fluctuation current (transient current) flows between the electrodes. By detecting the fluctuation current, it will be possible to receive the data.

As a standard specification of the communication method, "ISO/IEC17982 Closed Capacitive Coupling Communication Physical Layer Edition 1" or "IEEE802.15.6 Human Body Communication" is defined. They have different signal formats and the like but a data transmission principal thereof is as described above.

In particular, the former employs the Manchester coding shown in FIG. 1B. The Manchester coding is a method that a binary data of 0 and 1 to be transmitted is allocated to respective falling and rising edges of a waveform. Hereinafter, this method is used for illustrative description. Note that the present technology is not limited to apply the method.

FIG. 1C is a view for describing a basic principle of the human body communication that is electric field communication using a human body as a medium. Here for simplifying the description, the transmission electrodes 10a and 10b and the reception electrodes 11a and 11b have the same shape and are parallel flat plates arranged in equal spaces (an area of each electrode denotes "A" and a space between the electrodes denotes "d").

As shown in FIG. 1C, the transmission electrodes 10b and the reception electrodes 11b are arranged at the position near a medium, i.e., a human body 12. Hereinafter, these electrodes may be referred to as human body side electrodes 10b and 11b using the same symbols. In addition, the transmission electrodes 10a and reception electrodes 11a may be referred to as space electrodes 10a and 11a using the same symbols. Note that the human body 12 is insulated from the human body side electrodes 10b and 11b. In other words, it can be said that the human body 12 is in contact with the human body side electrodes 10b and 11b via a predetermined insulator.

By the transmitter 13, transmitted data is Manchester-coded and is converted into a voltage vs(t), which is applied to the transmission electrodes 10a and 10b. Thus, a fluctuating electric field Es(t) is generated around the transmission electrodes 10a and 10b. Note that a parameter t denotes a time.

Corresponding to the fluctuating electric field Es(t), a fluctuating electric field Er(t) is generated around the reception electrodes 11a and 11b. The transient current corresponding to the fluctuating electric field Er(t) flows between the electrodes via a receiver 14 and a circuit input end voltage vr(t) is generated. The input end voltage vr(t) is decoded by the receiver 14 and is acquired as received data.

The fluctuating electric field Er(t) generated around the reception electrodes 11a and 11b is determined by an electrical field Ea(t) caused by lines of an electric force arriving around the reception electrodes 11a and 11b mainly through a space and by an electric field Ei(t) caused by lines of an electric force made by electric charges generated around the reception electrodes 11a and 11b through electrostatic induction on the human body 12. In a case where the electric field Ei(t) caused through the electrostatic induction on the human body 12 has great contribution, the human body communication where signals are transmitted and received is realized when the human body side electrodes 10b and 11b come in contact with the human body 12. Note that the electric fields Ea(t) and Ei(t) are parameters corresponding to an air dielectric constant (approximation by vacuum dielectric constant $\varepsilon_0$), human body's conductivity $\sigma$, a relative dielectric constant $\varepsilon r$, and the like.

The basic principle shown in FIG. 1C is not limited to the human body communication using the human body 12 as the medium and is also applied to the case that other optional medium is used (medium includes liquid or gas).

FIG. 2 is a view for describing an operating principle of a reception side. Note that the electric field is uniform around the reception electrodes 11 and is fluctuated from t=0 in a stepwise. A potential difference vr(0) between the space electrode 11a and the human body side electrode 11b at the reception side at the time t=0 is represented by the following expression:

$$v_r(0) = E_r(0) \cdot d = E'_r(0) \cdot d \quad \text{[Expression 1]}$$

Here, E'r(0) denotes the electric field between the electrodes. That is to say, at the time t=0, the electric field Er(0) around the electrodes=the electric field E'r(0) between the electrodes.

As shown in FIG. 2, electric charges caused through the electrostatic induction corresponding to the electric field Er(t) are generated on upper surfaces and lower surfaces of the space electrode 11a and human body side electrode 11b. The space electrode 11a and human body side electrode 11b are connected via the receiver 14 having impedance Z. Thus, electric charges are transferred corresponding to the potential difference E'r(t)·d between the electrodes and become the same at t→∞. In addition, electric field intensity E'r(t) will be →0.

Here, the electric field is uniform around he reception electrodes 11a and 11b. The reception electrodes 11a and 11b are the parallel flat plates (area "A", distance d<<A^{1/2}) and have capacitance C=$\varepsilon$0 A/d. In addition, the impedance Z of the receiver 14 is assumed as pure resistance R.

As shown in FIG. 2, electric charges Q are generated through the electrostatic induction corresponding to the electric field Er(t) in a region V at a lower side of the space electrode 11a. The electric charges Q are attenuated like CR discharges by a current ir(t) flowing through the receiver 14. Specifically, electric charges Q(t) are represented by the following expression:

$$Q(t) = Q(0) - \int_0^t i_r(\xi) d\xi \quad \text{[Expression 2]}$$

Accordingly, the vr(t) is represented by the following integral equation from the relationship of Q(t)=Cvr(t), ir(t)=vr(t)/R.

$$v_r(t) = \frac{Q(0)}{C} - \frac{1}{CR} \int_0^t v_r(\xi) d\xi \quad \text{[Expression 3]}$$

The solution of the integral equation is as follows:

$$v_r(t) = v_r(0) \exp\left(-\frac{t}{CR}\right) = E'_r(0) d \exp\left(-\frac{t}{CR}\right) \quad \text{[Expression 4]}$$

For consideration in view of reception properties, symbol energy is calculated by using the potential difference vr(t). If received signal energy Eb [J/bit] for one symbol is considered as twice of the energy for ½ symbol of the Manchester coding, the following expression is calculated.

$$E_b = 2 \int_0^{T/2} \frac{v_r^2(t)}{R} dt = \frac{2E_r'^2(0)d^2}{R} \frac{CR}{2} \left\{1 - \exp\left(-\frac{t}{CR}\right)\right\} = CE_r'^2(0)d^2 \left\{1 - \exp\left(-\frac{t}{CR}\right)\right\} \quad \text{[Expression 5]}$$

FIGS. 3A and B are graphs showing the received signal energy Eb and the potential difference vr(t) provided from the above expressions, respectively. Here, there are shown normalized graphs of Er(0) d=1. As shown in FIG. 3A, the greater the capacitance C, i.e., the area "A" of the electrode, is, the greater the received signal energy Eb is.

On the other hand, if the resistance R has the value greater than the predetermined value in each capacitance C, the received signal energy Eb is decreased. Similarly, this may also apply to the impedance Z. In other words, the value of each capacitance C where the received signal energy Eb is started to be decreased is set as a threshold value. If the impedance Z is set lower than the threshold value, the received signal energy Eb can be maintained high.

As shown in FIG. 3B, a time constant T is determined by the capacitance C and the resistance R. In view of the above, the impedance Z is set as appropriate on the basis of a sampling frequency of an AD converter or the like arranged at a later part of the receiver 14, for example. In this manner, it finds that if the area "A" of the electrode is increased, communication performance can be improved in the quasi-electrostatic field communication. In addition, it finds that if the impedance Z of the receiver 14 is set to the above-described threshold value, high communication performance is exhibited.

[Mobile Terminal]

Figure 4:
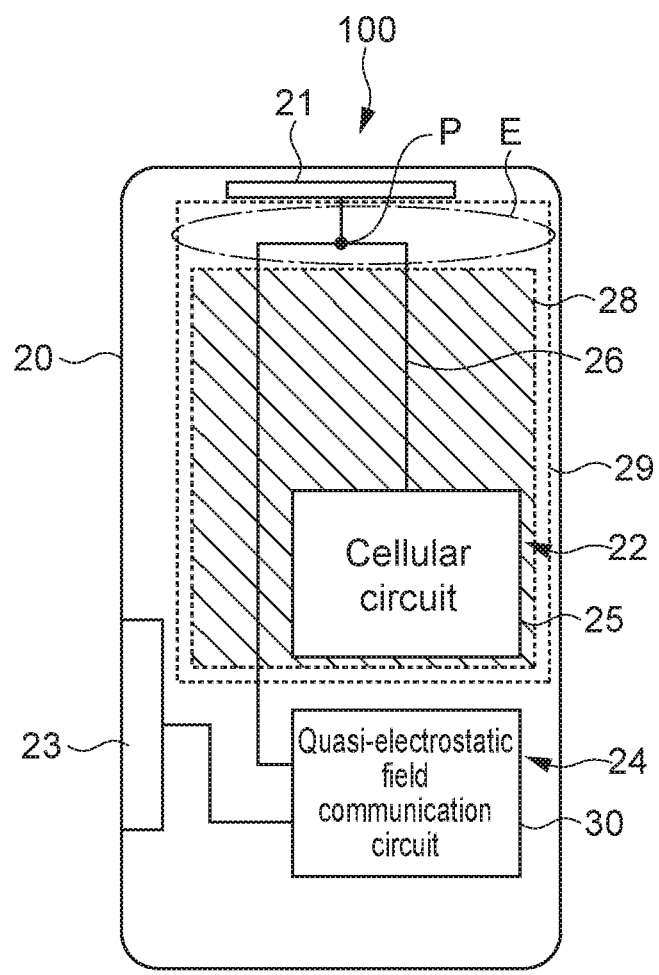
FIG. 4 is a schematic view showing a configuration example of a mobile terminal according to a first embodiment.
Figure 5:
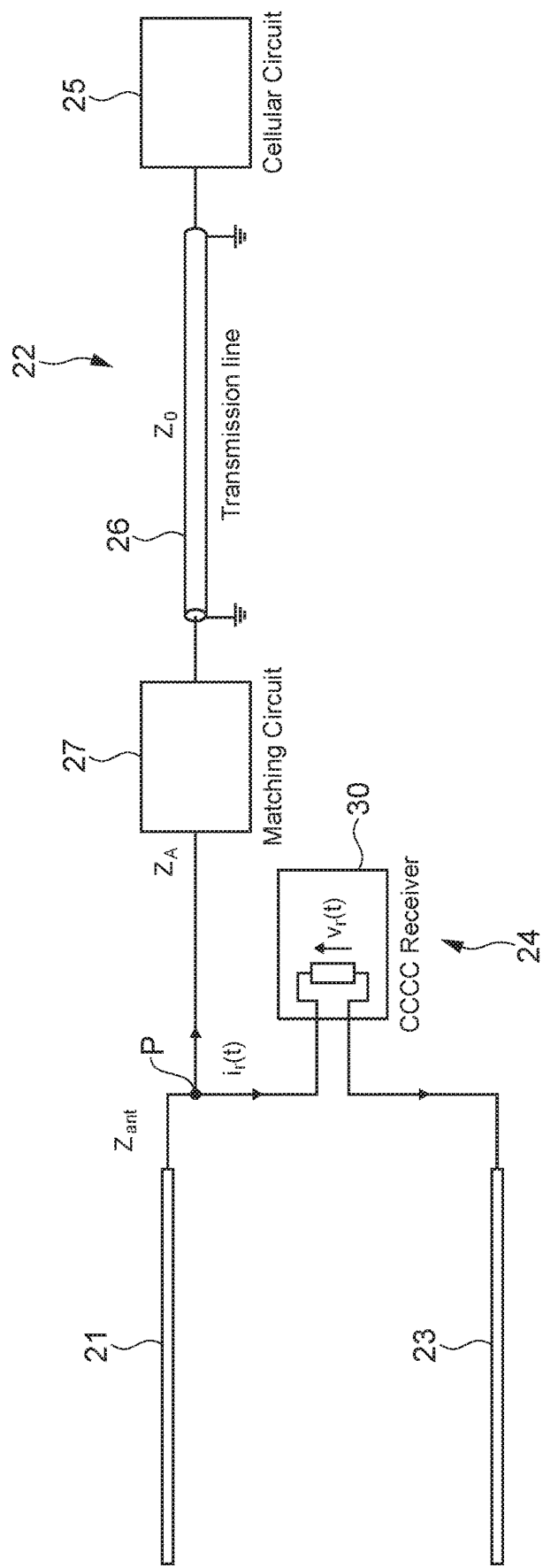
FIG. 5 is a schematic view showing a configuration example of the mobile terminal according to the first embodiment.

FIG. 4 and FIG. 5 are schematic views showing a configuration example of a mobile terminal according to a first embodiment. A mobile terminal 100 is an embodiment of the information processing apparatus according to the present technology and is capable of executing both of the cellular communication and the human body communication. Note that in this embodiment, the cellular communication corresponds to the other communication different from the electric field communication.

The mobile terminal 100 includes a case 20, an antenna 21, a cellular communication unit 22, a human body side electrode 23, and an electric field communication unit 24. The case 20 houses the antenna 21 and the respective communication units 22 and 23 and is held by a user when using the mobile terminal 100. A material of the case 20 is not limited and a metal material such as aluminum, a resin material such as plastic, or the like is used, for example.

The antenna 21 is an antenna for cellular communication and is used for telephone communication (voice communication) by the mobile terminal 100. The antenna 21 is formed of a conductor such as a metal and typically has a plate shape. For example, as the antenna 21, a sheet metal including gold, silver, aluminum or the like, or any other conductor is used. A shape and a size are also not limited. For example, the antenna 21 having a size of about 1 cm square or a size of about 0.5 cm×about 2 to 3 cm is used. The antenna 21 having any other shape and size may be used.

Note that the antenna 21 is typically arranged near an upper end or the like that is unlikely covered with a user's hand in order to maintain high emission properties. It should be appreciated that the arrangement is not limited thereto.

The cellular communication unit 22 includes a cellular circuit 25, a transmission line 26, an impedance matching circuit (hereinafter simply referred to as matching circuit) 27. As shown in FIG. 5, the antenna 21 is electrically connected to the matching circuit 27. Then, at a later part of the matching circuit 27 viewed from the antenna 21, the transmission line 26 and the cellular circuit 25 are arranged. The cellular communication unit 22 corresponds to other communication unit.

The cellular circuit 25 generates a transmitted signal and outputs the signal to the antenna 21 when transmitting. An electric wave (electromagnetic wave) is emitted from the antenna 21 corresponding to the transmitted signal. When receiving, a received signal received by the antenna 21 is decoded by the cellular circuit 25 and is output to a speaker or the like, for example. As a signal for the cellular communication, a signal of a frequency band of 700 MHz, 800 MHz, 900 MHz, 1.5 GHz, 1.7 GHz, 2.0 GHz, or the like is used.

The cellular communication unit 22 is designed as a so-called 50Ω system for a signal of a cellular band. The matching circuit 27 matches impedance between the antenna 21 and the cellular circuit 25. For example, as shown in FIG. 4, in this embodiment, the cellular communication unit 22 is arranged on a substrate 29 including the ground plane 28.

No ground plane 28 is formed on an emission region E near the antenna 21. At the emission region E, impedance matching is executed by the matching circuit 27 (not shown in FIG. 4). On the other hand, as shown in FIG. 5, the transmission line 26 and the cellular circuit 25 are arranged at the region where the ground plane 28 is formed, and are grounded as appropriate. Thus, a mismatch loss can be sufficiently decreased.

The human body side electrode 23 is an electrode for the human body communication and is arranged inside the case 20. The human body side electrode 23 is formed of a plate-shaped conductor and its material, shape, size, or the like is not limited. In addition, the human body side electrode 23 is arranged at the position near the human body and is provided on a back surface, a side surface, or the like, for example, where is likely covered with the user's hand, for example. It should be appreciated that the arrangement is not limited thereto. Note that the human body side electrode 23 corresponds to the medium side electrode.

The electric field communication unit 24 includes a quasi-electrostatic field communication unit 30. As shown in FIG. 4 and FIG. 5, the quasi-electrostatic field communication unit 30 is electrically connected to each of the antenna 21 and the human body side electrode 23 and is capable of executing the electric field communication by using the antenna 21 and the human body side electrode 23. In other words, in this embodiment, the antenna 21 for the cellular communication is also used for the human body communication.

Figure 6:
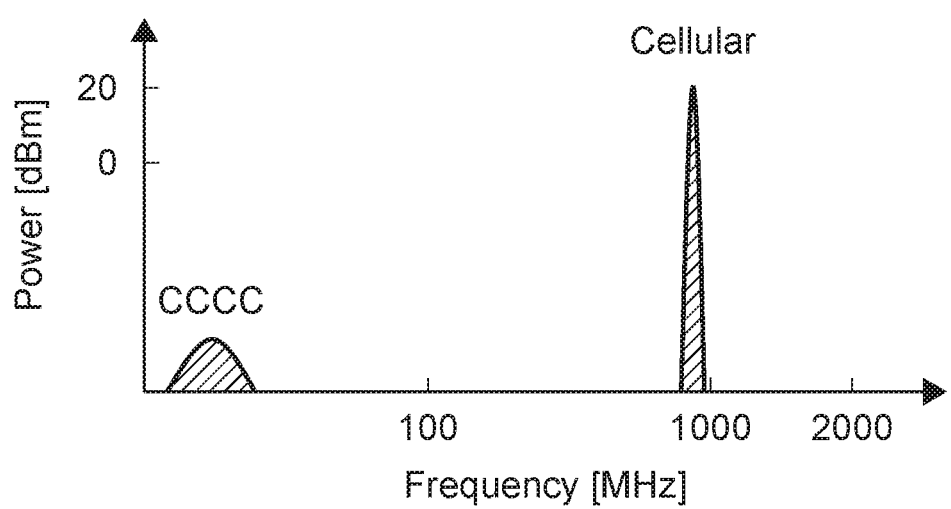
FIG. 6 is a graph of comparing a frequency band of a signal of cellular communication with a frequency band of a signal of human body communication.

FIG. 6 is a graph of comparing a frequency band of a signal of the cellular communication with a frequency band of a signal of the human body communication. In this embodiment, as the signal of the human body communication, a signal of several tens MHz of the frequency band is used, for example. Thus, the frequency band of the cellular communication signal and the frequency band of the human body communication signal are far apart each other.

In this embodiment, it is set such that the impedance of the antenna 21 to the human body communication signal is higher than the impedance of the antenna 21 to the cellular communication signal. For example, such setting is possible by designing the antenna 21 by suitably arranging electronic components such as a capacitor and an inductor. By realizing low impedance to the cellular communication signal and high impedance to the human body communication signal, it will be possible to decrease the size of the antenna 21 and increase efficiency of generating the electric field.

As shown in FIG. 4 and FIG. 5, a connection point P is arranged between the antenna 21 and the matching circuit 27. Via the connection point P, the antenna 21 is connected to the quasi-electrostatic field communication unit 30. Specifically, the quasi-electrostatic field communication unit 30 is directly connected to the antenna 21 at an antenna 21 side of the matching circuit 27, i.e., a region of not the 50Ω system. This allows the impedance of the quasi-electrostatic field communication unit 30 expected from the cellular circuit 25 to be sufficiently higher than input-output characteristic impedance of the antenna 21 and the cellular circuit 25.

Thus, it will be possible to set the impedance of the quasi-electrostatic field communication unit 30 to the cellular communication signal to be sufficiently high as compared with the cellular circuit 25. In other words, it will be possible to connect a high impedance line from the quasi-electrostatic field communication unit 30 to a low impedance line to the cellular band. As a result, it will be possible to ensure isolation of the cellular communication signal and to fully inhibit the signal from flowing into the quasi-electrostatic field communication unit 30 when the cellular communication is executed. In addition, it will be possible to fully inhibit a signal loss in the cellular communication.

In addition, before grounding to a ground by the matching circuit 27, the antenna 21 can be connected to the quasi-electrostatic field communication unit 30. Therefore, it will be possible to operate the antenna 21 to the human body communication signal while keeping high impedance characteristics and to exhibit high communication performance.

As described above, note that the impedance of the quasi-electrostatic field communication unit 30 may be set as appropriate to the threshold value where the received signal energy Eb is started to be decreased as described by referring to the graph of FIG. 3A. It should be appreciated that it is not limited thereto and a value exceeding the threshold value may be set.

By operating the antenna 21 and the cellular communication unit 25, the cellular communication can be executed, e.g., it will allow the voice communication or the data communication with other mobile terminals. In addition, by operating the antenna 21, the human body side electrode 23, and the electric field communication unit 24, the mobile terminal 100 is held by one hand and the other hand is caused to be in contact with other communication apparatus, which allows the human body communication. Thus, it will be possible to perform the human body communication. Note that a configuration of the other communication apparatus is not limited, and the configuration to which the present technology is applied or other configurations may also be possible.

In a case where the mobile terminal 100 is provided with a function of the quasi-electrostatic field communication, it needs to mount the space electrode and the human body side electrode. Adding these new electrodes to a mobile terminal on which a variety of antennas, devices such as a camera, a buttery, a variety of circuit substrates, and the like are mounted at a high density may be the cause of an increase in size of an apparatus. In addition, for ensuring desirable transmission performance, it needs to arrange the space electrode and the human body side electrode at suitable positions, respectively depending on a holding manner (position of hand) under a normal use condition or the like. It results in design limitation.

In this embodiment, the electric field communication is executed by using the antenna 21 used in the cellular communication different from the electric field communication. Thus, it will be possible to decrease the number of parts needed for the electric field communication and to avoid an increase in size of an apparatus. In addition, the antenna 21 is arranged at the part of the case 20 not covered with a user's hand in order to acquire high emission properties of electric waves. Accordingly, in a case where the antenna 21 is also used as the space electrode, the antenna 21 is not covered with the hand in the quasi-electrostatic field communication. It will be thus possible to exhibit high communication performance.

The human body side electrode 23 is arranged at the position where is likely covered with the hand. With this arrangement, it will be possible to ensure a space between the human body side electrode 23 and the antenna 21 and to capture the electric field through the electrostatic induction on the human body. Accordingly, in the present technology, by arranging the human body side electrode 23 at suitable position, it will be possible to easily exhibit high communication performance. In other words, as compared with the case that both of the space electrode and the human body side electrode are newly mounted, there is a high design freedom, and the size of the apparatus is advantageously decreased.

For example, in a case where the antenna is shared by two or more different wireless communication systems, configurations are conceivable such that the connection between the antenna and the communication unit is switched by a switch, the signal is filtered by a splitter (duplexer), or the like. In these configurations, the input-output characteristic impedance of the antenna and each communication unit is generally designed to be the 50Ω system.

As described above, in this embodiment, the antenna 21 is also used as the space electrode and the impedance of each of the cellular circuit 25 and the quasi-electrostatic field communication unit 30 is set as appropriate (cellular circuit 25 is 50Ω system). It is very difficult to realize the impedance design according to the present technology by using the switch, the splitter, or the like.

The mobile terminal 100 is an embodiment of the information processing apparatus according to the present technology and also functions as the electronic device according to the present technology. It is possible to use any apparatus capable of executing other communication different from the human body communication as the information processing apparatus and the electronic device according to the present technology. The other communication is not limited to the above-described cellular communication and may be wireless LAN communication such as WiFi, near-range wireless communication such as Bluetooth (registered trademark), or the like, for example. By sharing the antenna for each communication as the space electrode, the above-described effect can be exhibited.

For example, the information processing apparatus and the electronic device according to the present technology may include a smartphone, a mobile phone, a tablet PC (Personal Computer), a notebook PC, a TV, a PDA (Personal Digital Assistant), a mobile type AV prayer, an electronic book, a digital still camera, a cam coder, a game machine, a projector, a car navigation system, and the like.

In addition, an electric field communication system including at least one information processing apparatus according to the present treatment can be realized as the information processing system according to the present technology. For example, using the present technology, it will be possible to construct an automation ticket gate system, a variety of entrance and exit systems, an identification or authentication system or the like. It is also possible to improve security by using the fingerprint authentication system and the electric field communication according to the present technology in combination.

Second Embodiment

A mobile terminal in a second embodiment according to the present technology will be described. Hereinafter, as to the configurations and effects similar to the mobile terminal 100 described in the above embodiment, description thereof will be omitted or simplified.

Figure 7:
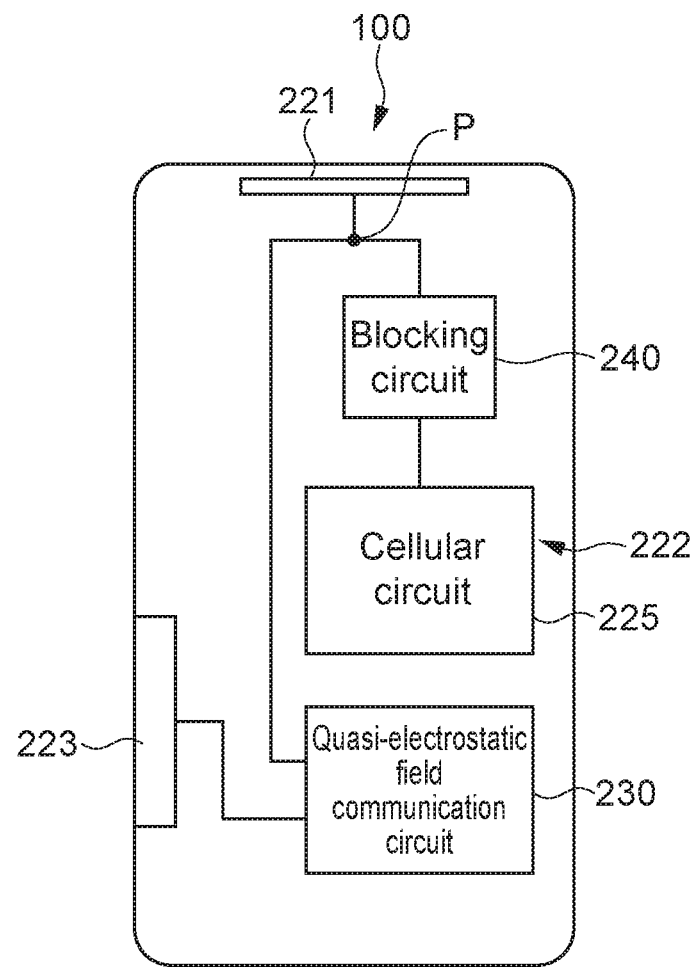
FIG. 7 is a schematic view showing a configuration example of a mobile terminal according to a second embodiment.
Figure 8:
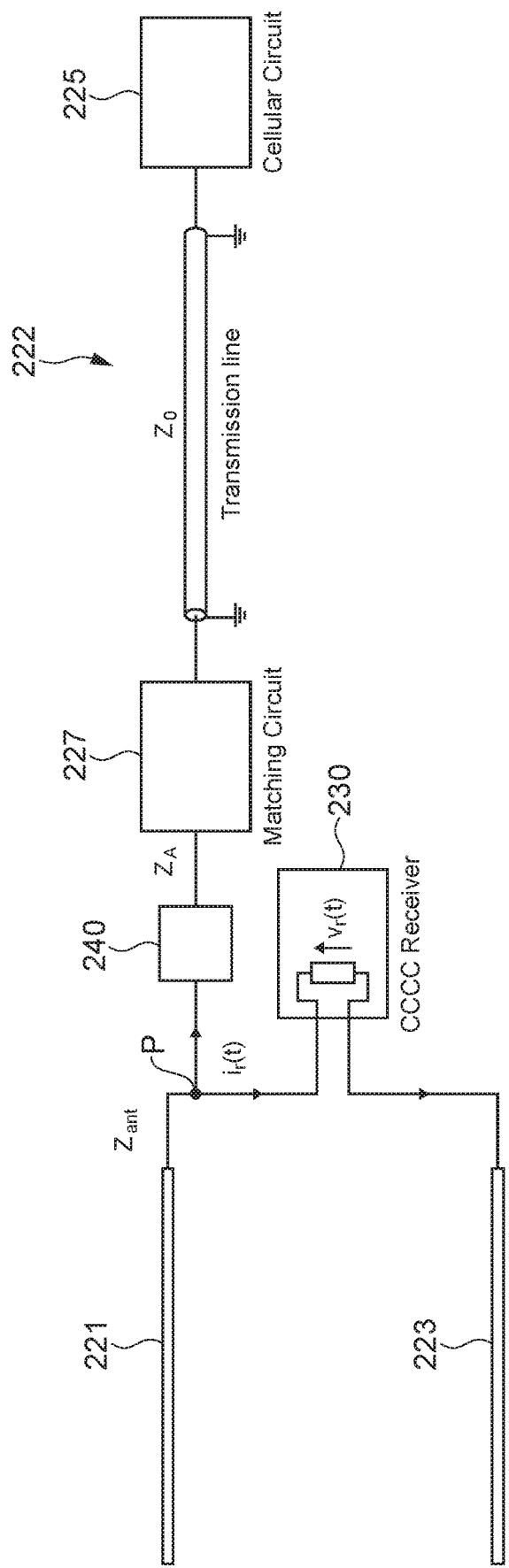
FIG. 8 is a schematic view showing a configuration example of the mobile terminal according to the second embodiment.

FIG. 7 and FIG. 8 are schematic views showing a configuration example of the mobile terminal according to the second embodiment. A mobile terminal 200 includes a blocking circuit 240 that inhibits a current generated through the human body communication from flowing into the cellular circuit 225 in the cellular communication unit 222. The blocking circuit 240 is provided between the connection point P and the matching circuit 227 (not shown in FIG. 7) but the position thereof is not limited thereto. In addition, specific configuration of the blocking circuit 240 is not limited and any configuration thereof may be used.

The blocking circuit 240 will allow the transient current flowing into the antenna 221, the quasi-electrostatic field communication unit 230, and the human body side electrode 223 corresponding to the reception of the human body communication signal to be restricted from flowing into the cellular circuit 225. In addition, it is also possible to restrict flowing of an output transient current when the human body communication signal is transmitted. With this configuration, it will be possible to improve communication performance of the human body communication and to prevent an increase of a consumed current. In addition, it is also possible to improve communication performance of the cellular communication.

Figure 9:
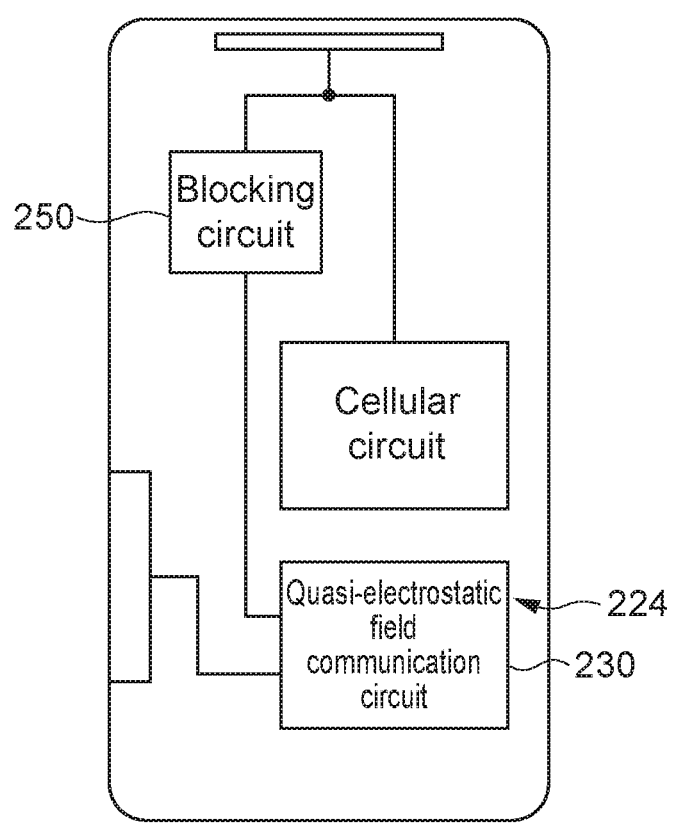
FIG. 9 is a schematic view showing an alternative embodiment of the mobile terminal shown in FIG. 7.

Also, as shown in FIG. 9, an electric field communication unit 224 may include a blocking circuit 250 that inhibits the cellular communication signal from flowing into a quasi-electrostatic field communication unit 230. As shown in FIG. 6, the frequency band of the cellular communication signal and the frequency band of the human body communication signal are far apart. However, its signal intensity has a relatively great value of 0.1 W to 1 W. Accordingly, by providing the blocking circuit 250, it will be possible to prevent a reception amplifier, for example, of the quasi-electrostatic field communication unit 230 from saturating or the like and to exhibit high communication performance. In addition, communication performance of the cellular communication is also improved. Note that both of the blocking circuit 240 shown in FIG. 7 and the blocking circuit 250 shown in FIG. 9 may be provided.

Other Embodiments

The present technology is not limited to the above-described embodiments. Other various embodiments may be realized.

Figure 10:
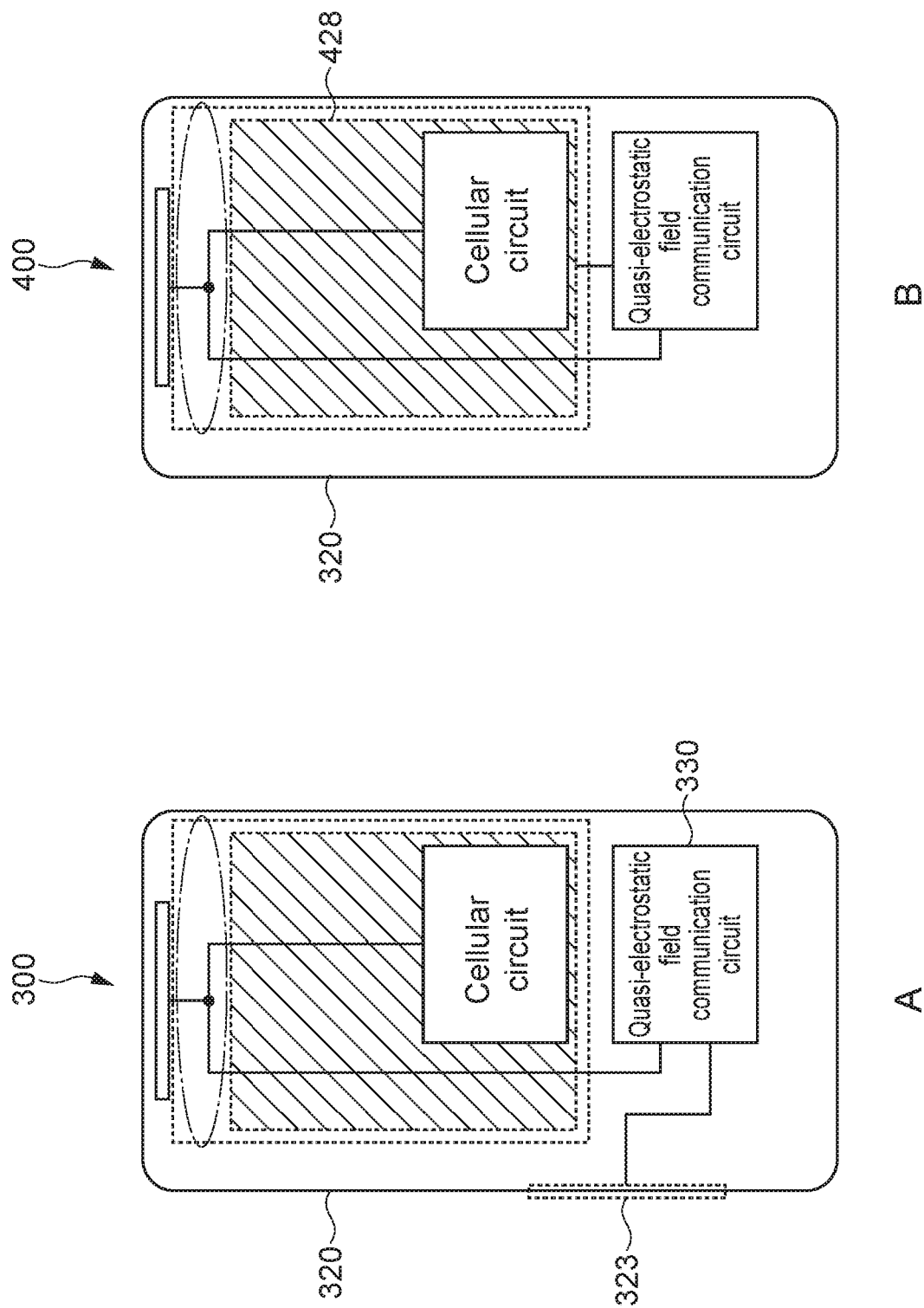
FIG. 10 are schematic views showing configuration examples of mobile terminals according to other embodiments.

FIG. 10 show schematic views showing configuration examples of mobile terminals according to other embodiments. A conductive member used for different applications from the human body communication in the mobile terminal may also be used as the human body side electrode. Thus, it does not need to newly arrange both of the space electrode and the human body side electrode. It will be possible to fully avoid an increase in size of an apparatus. In addition, it will be possible to exhibit high communication performance.

For example, like a mobile terminal 300 shown in FIG. 10A, a conductive member 323 forming at least a part of a case 320 may be used as the human body side electrode. For example, the parts where is likely covered with the user's hand is used as the human body side electrode and is connected to a quasi-electrostatic field communication unit 330. Alternatively, like a mobile terminal 400 shown in FIG. 10B, a ground plane 428 may be used as the human body side electrode. Other than those, the conductive member also used as the human body side electrode is not limited, for example, a power plane or the like may be used as the human body side electrode.

Figure 11:
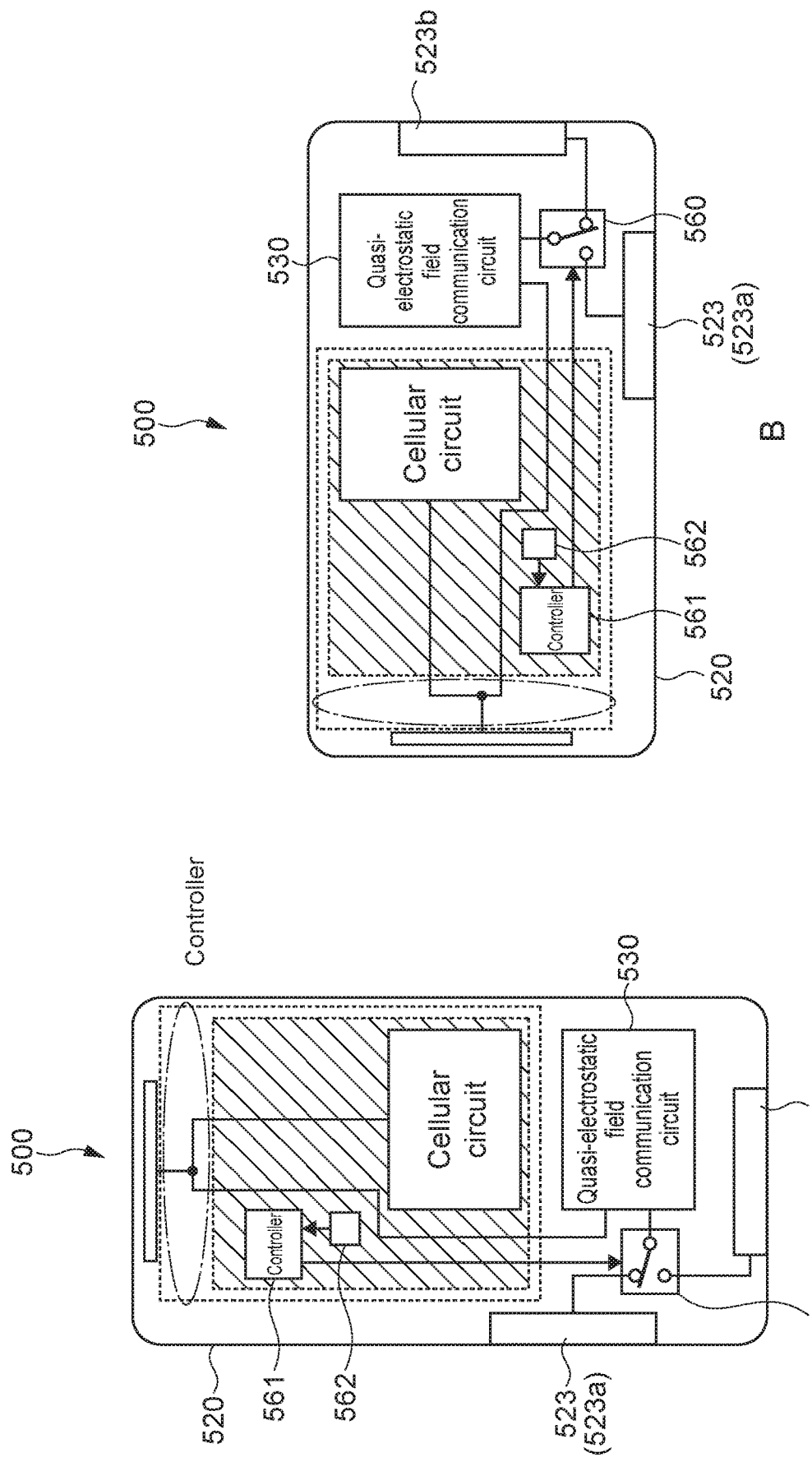
FIG. 11 are schematic views showing configuration examples of mobile terminals according to other embodiments.

FIG. 11 are schematic views showing configuration examples of mobile terminals. Each mobile terminal 500 includes a plurality of human body side electrodes 523, a switch 560, a switch controller 561, and a sensor unit 562. The switch 560, the switch controller 561, and the sensor unit 562 function as a selection unit.

A plurality of human body side electrodes 523 are arranged at different positions inside the case 520. The number of the plurality of human body side electrodes 523 is not limited. Three or more human body side electrodes 523 may be arranged. The switch 560 is capable of switching the human body side electrode 523 connected to a quasi-electrostatic field communication unit 530. A specific configuration of the switch 560 is not limited. The switch 560 may be optionally designed.

The sensor unit 562 is capable of detecting a status of the mobile terminal 500. The status of the mobile terminal 500 includes optional parameters, for example, a posture, a position, a buttery status, a temperature, a driving mode, or the like. As the sensor unit 562, an optional sensor such as an acceleration sensor, a gyro sensor, a compass sensor, a GPS sensor, a proximity sensor, a touch sensor, an illuminance sensor, and the like may be used, for example.

The switch controller 561 controls a switching operation of the switch 560 on the basis of a detection result from the sensor unit 562. As the switch controller 561, a MICON (microcomputer) where a CPU, a memory (RAM, ROM), and the like are included in one chip, for example is used. It should be appreciated that it is not limited thereto and any IC (integrated circuit) and the like may be used.

As shown in FIGS. 11A and B, in this embodiment, the sensor unit 562 detects the posture of the mobile terminal 500. As shown in FIG. 11A, in a case where the posture of the mobile terminal 500 is vertical, a human body side electrode 523a arranged at the side in the posture is connected to the quasi-electrostatic field communication unit 530. As shown in FIG. 11B, in a case where the posture of the mobile terminal 500 is horizontal, a human body side electrode 523b arranged at the side in the posture is connected to the quasi-electrostatic field communication unit 530. Thus, depending on the posture of the mobile terminal 500, the human body side electrode 523 arranged at the position where is likely covered with the hand is selected. As a result, it will be possible to exhibit very high communication performance.

In the examples shown in FIG. 11, switching of the human body side electrode 523 of the mobile terminal 500 is executed on the basis of the idea that side part is likely to be held. It should be appreciated that it is not limited thereto and the position and switching of the human body side electrode 523 may be set appropriate depending on the shape, the function, and the like of the mobile terminal 500.

Among the features according to the present technology, it is also possible to combine at least two features of the respective embodiments described above. In other words, the various features described in the respective embodiments may be optionally combined without distinguishing among the respective embodiments. In addition, the various effects described above are only illustrative and are not limited thereto and other effects may be exhibited.

The present technology may also have the following structures.

(1) An information processing apparatus capable of executing electric field communication, including:
an antenna used for other communication different from the electric field communication;
a medium side electrode; and
a communication unit that is electrically connected to each of the antenna and the medium side electrode and executes the electric field communication by using the antenna and the medium side electrode.

(2) The information processing apparatus according to (1), in which
the other communication is cellular communication. (3) The information processing apparatus according to (1) or (2), further including:
other communication unit that has an impedance matching circuit electrically connected to the antenna and executes the other communication, in which
the communication unit is connected to the antenna via a connection point between the antenna and the matching circuit.

(4) The information processing apparatus according to (3), in which
the antenna has impedance to a signal of the electric field communication higher than impedance to a signal of the other communication.

(5) The information processing apparatus according to (4), in which
the communication unit has impedance to the signal of the other communication higher than that of the other communication unit.

(6) The information processing apparatus according to any one of (3) to (5), in which
the other communication unit has a blocking circuit that inhibits a current generated by the human body communication from flowing into the other communication unit.

(7) The information processing apparatus according to any one of (3) to (6), in which
the communication unit has a blocking circuit that inhibits a signal of the other communication from flowing into the communication unit.
(8) The information processing apparatus according to any one of (1) to (7), in which
the medium side electrode is a conductive member, the conductive member being used for other application different from the human body communication.
(9) The information processing apparatus according to (8), further including:
a case; in which
the medium side electrode is a part of the case.
(10) The information processing apparatus according to (8), in which
the medium side electrode is a ground plane or a power plane.
(11) The information processing apparatus according to any one of (1) to (10), further including:
a selection unit that selects one medium side electrode from a plurality of medium side electrodes and causes the one medium side electrode to electrically connect to the communication unit.
(12) The information processing apparatus according to (11), in which
the selection unit includes a sensor unit that detects a status of the information processing apparatus and selects the medium side electrode on the basis of a detection result of the sensor unit.
(13) The information processing apparatus according to (12), in which
the selection unit selects the medium side electrode on the basis of a posture of the information processing apparatus detected by the sensor unit.

REFERENCE SIGNS LIST

P connection point
10a, 11a space electrode
10b, 11b, 23, 223, 523 human body side electrode
12 human body
20, 320, 520 case
21, 221 antenna
22, 222 cellular communication unit
24, 224 electric field communication unit
25, 225 cellular circuit
27, 227 matching circuit
28, 428 ground plane
30, 230, 330, 530 quasi-electrostatic field communication unit
100, 200, 300, 400, 500 mobile terminal
240, 250 blocking circuit
321 conductive member
560 switch
561 switch controller
562 sensor unit

The invention claimed is:
1. An information processing apparatus comprising:
a first communication unit configured to execute wireless communication, the first communication unit is electrically connected to circuitry;
an antenna configured to transmit and receive the wireless communication, the circuitry is configured to electrically connect the first communication unit with the antenna;
a second communication unit configured to execute electric field communication, the circuitry and the antenna are electrically connected directly to the second communication unit;
a medium side electrode configured to transmit and receive the electric field communication, the second communication unit is electrically connected directly to the medium side electrode.
2. The information processing apparatus according to claim 1, wherein the second communication unit is configured to output current to the medium side electrode.
3. The information processing apparatus according to claim 1, wherein the second communication unit is electrically connected in series between the antenna and the medium side electrode.
4. The information processing apparatus according to claim 1, wherein the circuitry is from the group consisting of a matching circuit and a blocking circuit.
5. The information processing apparatus according to claim 4, wherein the matching circuit is configured to match impedance between the antenna and the first communication unit.
6. The information processing apparatus according to claim 4, wherein the blocking circuit is configured to inhibit a flow of current from the antenna to the first communication unit.
7. The information processing apparatus according to claim 1, wherein the wireless communication propagates in a manner that differs from how the electric field communication propagates.
8. The information processing apparatus according to claim 1, wherein the circuitry is configured to transfer the wireless communication from the antenna to the first communication unit.
9. The information processing apparatus according to claim 1, wherein the circuitry is configured to transfer the wireless communication from the first communication unit to the antenna.
10. The information processing apparatus according to claim 1, wherein the circuitry is electrically connected directly to the first communication unit.
11. The information processing apparatus according to claim 1, wherein the circuitry is electrically connected directly to the antenna.
12. The information processing apparatus according to claim 1, wherein the circuitry and the antenna are electrically connected directly to a connection point, the connection point is electrically connected directly to the second communication unit.
13. The information processing apparatus according to claim 1, wherein the circuitry is sited between the antenna and the first communication unit.
14. The information processing apparatus according to claim 1, wherein the wireless communication is cellular telephone communication.
15. The information processing apparatus according to claim 1, wherein the medium side electrode is in parallel with the antenna.
16. The information processing apparatus according to claim 1, wherein the medium side electrode is a ground plane or a power plane.
17. The information processing apparatus according to claim 1, wherein the medium side electrode is a flat plate.
18. The information processing apparatus according to claim 17, wherein the antenna is another flat plate.
19. An electronic device capable of executing the electric field communication, the electronic device comprising:

the information processing apparatus according to claim 1.

20. An information processing system comprising:
a plurality of information processing apparatuses capable of executing the electric field communication,
each of the information processing apparatuses comprising the information processing apparatus according to claim 1.

* * * * *